(12) United States Patent
Gale et al.

(10) Patent No.: US 9,348,883 B2
(45) Date of Patent: May 24, 2016

(54) SYSTEMS AND METHODS FOR REPLICATION REPLAY IN A RELATIONAL DATABASE

(75) Inventors: Jim Gale, San Francisco, CA (US); Scott Smith, San Francisco, CA (US)

(73) Assignee: CLUSTRIX, INC., San Francisco, CA (US)

( * ) Notice: Subject to any disclaimer, the term of this patent is extended or adjusted under 35 U.S.C. 154(b) by 1232 days.

(21) Appl. No.: 13/151,040

(22) Filed: Jun. 1, 2011

(65) Prior Publication Data
US 2012/0310985 A1 Dec. 6, 2012

(51) Int. Cl.
*G06F 17/00* (2006.01)
*G06F 17/30* (2006.01)

(52) U.S. Cl.
CPC ............... *G06F 17/30578* (2013.01)

(58) Field of Classification Search
CPC .......... G06F 17/30286; G06F 17/30067; G06F 17/30578; G06F 9/466; G06F 11/0745; G06F 11/1474; G06F 17/30348
USPC .......... 707/609, 687, 802, 703, 704, 999.008, 707/610
See application file for complete search history.

(56) References Cited

U.S. PATENT DOCUMENTS

| | | | |
|---|---|---|---|
| 2002/0133507 A1* | 9/2002 | Holenstein et al. | 707/200 |
| 2004/0215670 A1* | 10/2004 | Holenstein et al. | 707/201 |
| 2009/0177710 A1* | 7/2009 | Holenstein et al. | 707/201 |
| 2010/0191884 A1* | 7/2010 | Holenstein et al. | 710/200 |
| 2010/0332449 A1* | 12/2010 | Holenstein et al. | 707/615 |
| 2012/0101990 A1* | 4/2012 | Holenstein et al. | 707/615 |

* cited by examiner

*Primary Examiner* — Mohammed R Uddin
(74) *Attorney, Agent, or Firm* — Knobbe, Martens Olson & Bear, LLP

(57) ABSTRACT

Systems and methods for replication replay in a relational database are disclosed. In one embodiment, a relational database includes a master database and a slave database, and events performed on the master database are stored in a log. A portion of the log is provided to a slave replay system associated with the slave database, and the slave replay system identifies a first table row associated with a first event of the portion of the log and a second table row associated with a second event in the portion of the log. The slave replay system replays the first and second events on the slave database in parallel if the first and second rows are different rows with unique sets of values, and otherwise replays the first and second events serially.

24 Claims, 11 Drawing Sheets

| | Event | Trans End | |
|---|---|---|---|
| Transaction 1 58a | A | | 56a |
| | B | | 56b |
| Transaction 2 58b | C | * | 56c |
| | D | * | 56d |
| Transaction 3 58c | E | | 56e |
| | F | * | 56f |

| Event | Trans ID | Trans End | |
|---|---|---|---|
| A | Trans 1 | | 64a |
| E | Trans 3 | | 64b |
| D | Trans 2 | * | 64c |
| B | Trans 1 | | 64d |
| C | Trans 1 | * | 64e |
| F | Trans 3 | * | 64f |

| Identifier | Doctor | Location | Patient | Time |
|---|---|---|---|---|
| 2 | Jones | Palo Alto | Brown | 8:00 AM |
| 3 | Smith | San Jose | Stevens | 11:00 AM |
| 11 | Jones | San Jose | Wilson | 2:00 PM |
| 14 | Lee | Palo Alto | White | 11:00 AM |

*Fig. 4*

| Event | Trans ID | Trans End | |
|---|---|---|---|
| Create a table T1 with integer columns (A B), where A is a primary key | DDL | | 204a |
| Create a table T2 with integer columns (C D) | DDL | | 204b |
| Insert a row into T1: (1 0) | 1 | * | 204c |
| Insert a row in T1: (2 0) | 2 | | 204d |
| Update T1: (1 0) -> (1 1) | 2 | * | 204e |
| Update T1 (2 0) -> (3 1) | 3 | * | 204f |
| Insert a row into T2: (0 0) | 4 | * | 204g |
| Insert a row into T2: (0 0) | 5 | * | 204h |
| Update T1 (3 1) -> (3 2) | 6 | * | 204i |
| Insert a row into T2: (0 1) | 7 | * | 204j |

*Fig. 7*

| Table ID | Row Identifier |
|---|---|
| T2 | (0 0) |
| T1 | A=3 |

220

| |
|---|
| Insert a row into T2: (0 0) |
| Update T1 (3 1) -> (3 2) |

| Table ID | Row Identifier |
|---|---|
| T2 | (0 0) |
| T1 | A=3 |
| T2 | (0 1) |

220

| |
|---|
| Insert a row into T2: (0 0) |
| Update T1 (3 1) -> (3 2) |
| Insert a row into T2: (0 1) |

240 } Third Batch

Fig. 8H

| Table ID | Primary Key (ID) | Unique Key 1 (Doctor, Time) | Unique Key 2 (Patient, Time) | |
|---|---|---|---|---|
| Appointments | 2 | (Jones, 8:00 AM) | (Brown, 8:00 AM) | 258a |
| Appointments | 14 | (Lee, 11:00 AM) | (White, 11:00 AM) | 258b |

*Fig. 9*

SYSTEMS AND METHODS FOR REPLICATION REPLAY IN A RELATIONAL DATABASE

BACKGROUND

1. Field of the Invention

The present invention relates to systems and methods for replication replay in a relational database.

2. Description of the Related Art

A relational database can include a master database and a slave database to improve access to data and/or to provide data redundancy. The master database and the slave database can be in different physical locations, and can be in communication over a network. By distributing data in a relational database across a master database and a slave database, the scalability, reliability, availability and/or performance of the relational database can be improved.

Operations performed on the master database can be recorded in a log. The log can be transferred in all or part to a replay system associated with the slave database, and thereafter the replay system can replay the operations in the log on the slave database so that the state of the slave database becomes up-to-date. The latency of the slave database when replaying a log can be an important consideration. For example, the master database can be under a relatively high write load, and a low replay throughput on the slave database can cause the slave database to lag behind the master database and become outdated.

There is a need for improved systems and methods of slave database replay in a relational database system. Additionally, there is a need for reducing the latency of slave database replay, while maintaining the integrity of the data stored in the slave database.

SUMMARY

The systems, methods and devices of the present disclosure each have several innovative aspects, no single one of which is solely responsible for the desirable attributes disclosed herein.

In one embodiment, a method of replaying transactions in a slave database is provided. The method includes receiving a sequence of events executed on a master database, the sequence of events associated with one or more tables and at least one transaction of the master database. The method further includes identifying a first row of the one or more tables associated with a first event in the sequence, identifying a second row of the one or more tables associated with a second event in the sequence, the second event after the first event, and replaying the first and second events on the slave database in parallel if the first and second rows are different rows with unique sets of values, and otherwise replaying the first and second events serially. The method is performed by one or more computing devices.

In another embodiment, a non-transitory computer-readable storage medium comprising instructions that when executed perform a method of replaying transactions in a slave database is disclosed. The method includes receiving a sequence of events executed on a master database, the sequence of events associated with one or more tables and at least one transaction of the master database. The method further includes identifying a first row of the one or more tables associated with a first event in the sequence, identifying a second row of the one or more tables associated with a second event in the sequence, the second event after the first event, and replaying the first and second events on the slave database in parallel if the first and second rows are different rows with unique sets of values, and otherwise replaying the first and second events serially.

In another embodiment, a system for replaying transactions on a slave database is disclosed. The system includes a slave replay module configured to receive a transaction log including a sequence of events executed on a master database, the sequence of events associated with one or more tables and at least one transaction of the master database. The system further includes one or more computing devices operative to implement the slave replay module. The slave replay module is configured to identify a first row of the one or more tables associated with a first event in the sequence, and to identify a second row of the one or more tables associated with a second event in the sequence, the second event after the first event. The slave replay module is configured to replay the first and second events on the slave database in parallel if the first and second rows are different rows with unique sets of values and to otherwise replay the first and second events serially.

In another embodiment, a method of replaying transactions on a slave database is disclosed. The method includes receiving a sequence of events associated with a plurality of transactions executed on a master database and replaying the events in the sequence of events on the slave database such that the slave database is consistent with a state of the master database after execution of the sequence of events, wherein at least a portion of the events in the sequence of events are replayed in parallel. The method further includes committing the slave database one or more times such that the atomicity of the plurality of transactions is preserved. The method is performed by one or more computing devices.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

FIG. 3A is a schematic diagram of one example of a portion of a transaction log.

FIG. 3B is a schematic diagram of another example of a portion of a transaction log.

FIG. 4 is a schematic diagram of one example of a database table.

FIG. 7 is a schematic diagram of another example of a portion of a transaction log.

FIGS. 8A-8H are schematic diagrams illustrating a state of a lock table and a batch list at various instances of time in a method of replaying the portion of the transaction log of FIG. 7 in accordance with one embodiment.

FIG. 9 is a schematic diagram of one embodiment of a lock table.

DETAILED DESCRIPTION

Figure 1:
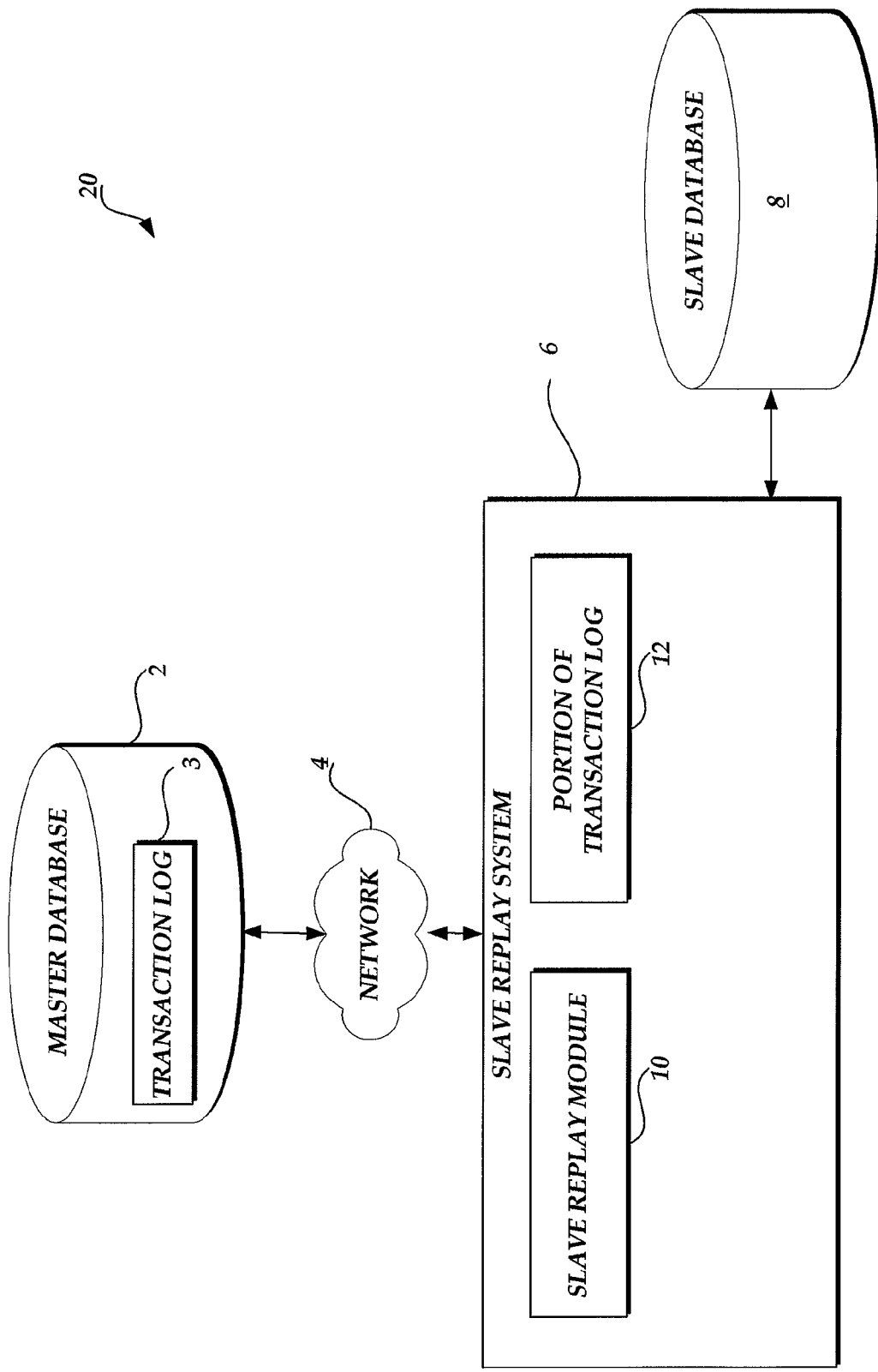
FIG. 1 is a schematic block diagram of one example of a relational database.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

A relational database can include data organized in a collection of relations or tables. The tables can each include one or more rows and one or more columns. Each column can represent an attribute of the database table, and each row can include a value associated with each table column. The values can be in any suitable format, including, for example, numbers, character strings and/or a time format.

The relational database can include a master database and a slave database, and the master database and the slave database can each include a copy of one or more tables associated with the relational database. Operations or events performed on the master database that affect the tables can be stored in a transaction log. All or portions of the transaction log can be sent to the slave database, and the slave database can replay the events of the log to update the state of the slave database.

It can be important to maintain the integrity of the data stored in the slave database. For example, the transaction log can include a sequence of events associated with one or more transactions, and events in different transactions may affect or be dependent upon the value of data in the same table row. Thus, it can be important to isolate the events of the transactions such that an event in a second transaction does not see the impacts of an event in a first transaction until the first transaction has completed.

Furthermore, it can be important to preserve the atomicity of transactions replayed on the slave database. For example, a plurality of events executed on the master database can be grouped together as a transaction, and it can be important to replay all of the events associated with a transaction before accepting or committing modifications to the slave database. Replaying transactions on a slave database in full before accepting or committing the modifications can help avoid the slave database having an inconsistent state. For example, a transaction may include a sequence of events for performing a transfer of funds from a first account associated with a first row of a database table to a second account associated with a second row of the database table. Thus, an inconsistent state of the database table can be avoided and the atomicity of the transaction can be preserved by accepting the changes to the database only after modifying the first row to reflect the withdrawal of funds from the first account and modifying the second row to reflect the deposit of funds to the second account.

Embodiments of the invention relate to systems and methods for replication replay in a relational database. In certain implementations described herein, a slave replay system can receive portions of a transaction log from a master database and replay the events in the transaction log on a slave database at least partially in parallel. For example, the slave replay system can examine the events in the log sequentially and add each event to a batch until the slave replay system detects an event associated with a table row affected by an event already in the batch. Upon encountering a conflicting event, the slave replay system can replay the events in the batch on the slave database in parallel, and the conflicting event can form the start of the next batch. By replaying the events of a transaction log on a slave database in batches, the latency of the slave database can be improved, thereby improving slave database performance and/or availability.

As used herein, an input device can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch-screen.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

Embodiments of the system are comprised of various modules as discussed in detail below. As can be appreciated by one of ordinary skill in the art, each of the modules can comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. The system may be written in any conventional programming language such as C, C++, BASIC, Pascal, Perl, or Java, and run under a conventional operating system.

Any embodiment of the invention disclosed herein may be implemented as a method, apparatus or article of manufacture using standard programming or engineering techniques to produce software, firmware, hardware, or any combination thereof. The term "article of manufacture" as used herein includes code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Overview of Slave Replay Systems and Methods

FIG. 1 is a schematic block diagram of one example of a relational database 20. The relational database 20 includes a master database 2, a network 4, a slave replay system 6, and a slave database 8.

The master database 2 includes data associated with the relational database 20. The data can be stored in tables, and each table can include one or more rows and one or more columns. Each table row can include a value for each column of the table. The master database 2 can further include a transaction log 3, which can include a serial listing of events or operations performed on the master database 2.

The network 4 can be any suitable communications link, including, for example, a local area network (LAN), a wireless local area network (WLAN), a wide area network (WAN), a metropolitan area network (MAN), and/or a cellular network. The network 4 can be used to communicate between the master database 2 and the slave replay system 6.

The slave database 8 can include data associated with the relational database 20, including one or more tables associated with the master database 2. In certain implementations, such as partitioned database configurations, the slave database 8 may include only a fraction of the data stored on the master database 2. To aid in keeping the slave database 8 synchronized with the master database 2, the slave replay system 6 can receive a portion 12 of the transaction log 3 from the master database 2 over the network 4. The slave replay system 6 can include a slave replay module 10 for replaying the portion 12 of the transaction log on the slave database 8. Once the log portion 12 has been replayed, the slave replay system 6 can obtain another portion of the transaction log from the master database 2 using the network 4.

Although the slave replay system 6 is illustrated as only including the portion 12 of the transaction log, the teachings herein are applicable to implementations in which the slave replay system 6 stores the entire transaction log 3. However, by sending the transaction log 3 to the slave replay system 6 in parts, the storage capacity of the slave replay system 6 can be reduced relative to a scheme in which the entire transaction log 3 is locally stored on the slave replay system 6.

Figure 2:
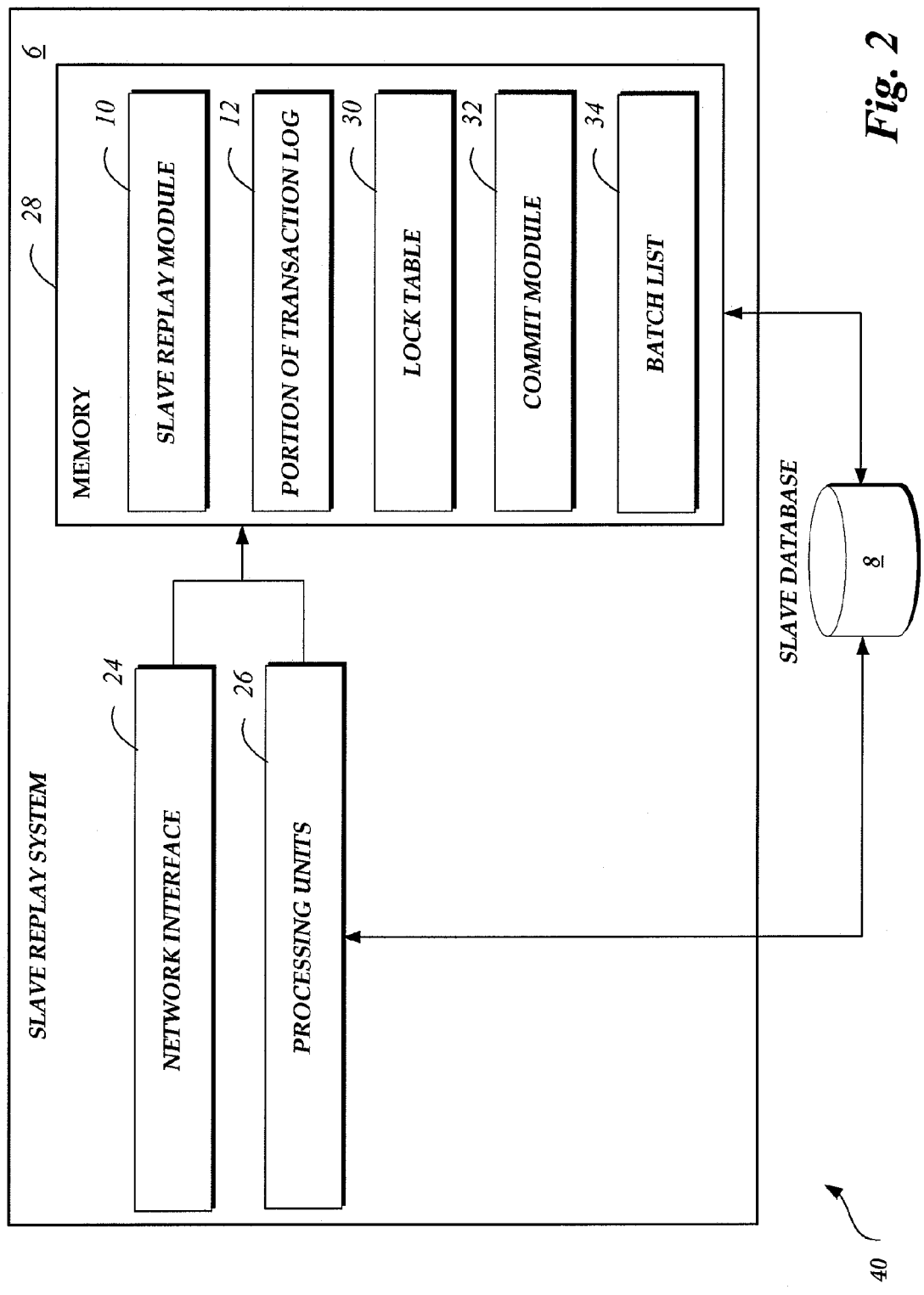
FIG. 2 is a schematic block diagram of a portion of a relational database in accordance with one embodiment.

FIG. 2 is a schematic block diagram of a portion of a relational database 40 in accordance with one embodiment. The portion of the relational database 40 includes the slave replay system 6 and the slave database 8. The slave replay system 6 includes a network interface 24, one or more processing units 26, and a memory 28. The slave replay system 6 can be used to replay operations executed on a master database on the slave database 8.

The one or more processing units 26 can aid in replaying events on the slave database 8. For example, the one or more processing units 26 can be used to execute software configured to replay the events on the slave database 8. The processing units 26 can include various hardware components, such as general purpose single or multi-chip processors, digital signal processors (DSPs), application specific integrated circuits (ASICs), field programmable gate arrays (FPGAs) or other programmable logic devices, discrete gate or transistor logic, discrete hardware components, or any combination thereof.

The memory 28 can include instructions for performing all or part of the functionality associated with replaying the events on the slave database 8. For example, the memory 28 can include a slave replay module 10 including instructions configured to replay the events on the slave database 8 when executed by the one or more processing units 26. The memory 28 can further include instructions for performing additional functionality, such as functionality associated with a commit module 32, which can be used to update the state of the slave database 8, as will be described below. Although the slave replay module 10 and commit module 32 are illustrated as being in the memory 28, in certain implementations the slave replay module 10 and/or the commit module 32 can be implemented in all or part using dedicated hardware components.

The memory 28 can be any suitable storage medium, including for example, random access memory (RAM), flash memory, registers, a hard disk, a removable disk or card, and/or any other form of storage medium known in the art. The memory 28 can include a lock table 30, a batch list 34, and a portion 12 of the transaction log, which will be described in detail further below. In certain implementations, the lock table 30 and/or the batch list 34 can be omitted in favor using another suitable means for locking rows and/or batching events, as will be described later below.

The network interface 24 can be used by the slave replay system 6 to communicate over a network, such as the network 4 of FIG. 1. For example, the network interface 24 can include a network interface card, such as an Ethernet card, to aid the slave replay system 6 in communicating with a master database. However, the network interface 24 need not include an interface card, and can be configured to communicate with a network in other ways. For example, in implementations in which the slave replay system 6 communicates with a master database over a wireless network, the network interface 24 can include an antenna and a transceiver for transmitting and receiving radio frequency signals over the wireless network.

The slave replay system 6 can be used to replay events executed on a master database on the slave database 8. For example, a master database can record operations performed on the master database in a transaction log, which can be received in all or in part by the slave replay system 6 over a network using the network interface 24. The received portion 12 of the transaction log can be stored in the memory 28. The log portion 12 can include a plurality of events associated with one or more transactions executed on the master database.

In one embodiment, the slave replay module 10 can analyze each event in the log portion 12 to determine one or more database table rows associated with the event. Information related to the database table rows associated with the event can be stored in the lock table 30. The slave replay module 10 can add events associated with rows that are not in the lock table 30 to the batch list 34. When the slave replay module 10 detects a conflicting event by determining that a row associated with the event is in the lock table 30, the events in the batch list 34 can be replayed in parallel on the slave database 8. Thereafter, the lock table 30 and the batch list 34 can be cleared, and the conflicting event can define the start of a new batch. The slave replay module 10 can add additional events from the log portion 12 for execution in the new batch. The slave replay module 10 can continue to execute the events in the log portion 12 in batches in this manner until the log portion 12 is empty. Additional details of the slave replay module 10 will be described in further detail below.

When the portion 12 of the transaction log is empty, the slave replay system 6 can fetch a new portion 12 of the transaction log from the master database. However, in some implementations the slave replay system 6 can receive the portion 12 of the log in other ways. For example, a master database can periodically send portions of the transaction log to the slave replay system 6 without an affirmative request by the slave replay system 6, and the new portion of the log can be added to log content already stored in the memory 28.

The commit module 32 can be used to commit updates to the slave database 8 made using the slave replay module 10. For example, the portion 12 of the transaction log can include one or more transactions, each of which can each include one or more events. The commit module 32 can be used to update the state of the slave database 8 at certain instances of time so as to preserve the consistency of the database and to avoid accepting or committing partially-executed transactions on the slave database. For example, a transaction may include a sequence of events for performing a transfer of funds from a first account associated with a first row of a database table to a second account associated with a second row of the database table, and it can be important to accept the changes to the rows only after updating both the first row and the second row to reflect the transfer of funds.

The commit module 32 can be used to update the slave database 8 after all of the events associated with a given transaction have been executed. By committing the slave database only after replaying all of the events associated with a given transaction, the atomicity of transactions on the slave database 8 can be preserved. In certain implementations, the commit module 32 does not necessarily commit the slave database 8 at each point the master database was committed. For example, when a first transaction and a second transaction are executed sequentially on a master database and committed after each transaction on the master database, the slave replay system 6 need not commit the slave database 8 after replaying the first transaction but before replaying the second transaction. Rather, the slave replay system 6 can be configured to commit both transactions simultaneously to the slave database 8 after replaying both the first and second transactions. Thus, the commit module 32 can have flexibility in committing the slave database 8 without compromising the transactional isolation of the slave database 8.

FIG. 3A is a schematic diagram of one example of a portion 60 of a transaction log. The illustrated log portion 60 includes a first entry 56a, a second entry 56b, a third entry 56c, a fourth entry 56d, a fifth entry 56e, and a sixth entry 56f. The first through sixth entries 56a-56f include information related to events associated with a first transaction 58a, a second transaction 58b, and a third transaction 58c, which can be a sequence of transactions executed on a master database. The log portion 60 can be stored on a slave replay system, and a slave replay module, such as the slave replay module 10 of FIGS. 1-2, can replay the events of the log portion 60 on a slave database.

Each of the first through sixth entries 56a-56f includes an event descriptor 52 for describing the event and a transaction endpoint indicator 54 for indicating whether the event is the last event of a transaction. For example, the first entry 56a includes information related to an event A, the second entry 56b includes information related to an event B, and the third entry 56c includes information related to an event C and information indicating that the event C is the last event of the first transaction 58a. Similarly, the fourth entry 56d includes information related to an event D and information indicating that event D is the last event of the second transaction 58b. Furthermore, the fifth entry 56e includes information related to an event E and the sixth entry 56f includes information related to an event F and information indicating that the event F is the last event of the third transaction 58c.

The events A, B, C, D, E, and F of the log portion 60 can be used to perform a variety of operations on the slave database. For example, certain events can be data modification language (DML) operations used to add, remove, and/or modify rows of a database table. Additionally, other events can be data definition language (DDL) operations, and can be used to add or remove table columns and/or create or remove tables of a database. The log portion 60 can include events associated with DML operations and/or DDL operations. For example, event A may be a DML operation adding a row to a table T1, event B may be a DML operation updating a row of the table T1, event C may be a DML operation removing a row of the table T1, event D may be a DDL operation creating a new table T2, event E may be a DML operation adding a row to the table T2, and event F may be a DML operation adding a row to the table T1.

Although the master database may have executed the events A, B, C, D, E and F partly in parallel, the log portion 60 represents a serial recordation of the events A, B, C, D, E and F. The master database can sequence the events in the log portion 60 to ensure that executing the events in the log portion 60 serially on the slave database will result in the slave database becoming properly updated. However, executing the events of the log portion 60 serially can increase the latency of the slave database. In implementations in which the master database is under a relatively high write load, the latency of the slave database can be an important consideration for the availability and/or performance of the slave database.

Executing the events of the log portion 60 in parallel on the slave database without proper sequencing can result in the slave database having an incorrect state. For example, the event D may create a table T2 and the event E may add a row to the table T2, and thus executing event E before or at the same time as event D may generate a database error. In certain implementations described herein, systems and methods of slave replay are provided for replaying a plurality of events in one or more batches of events such that the atomicity, consistency, isolation and durability (ACID) properties of the slave database are preserved. The batches can each include one or more events, and the batches can be executed in an order consistent with the order of events in the transaction log. The events within each batch can be executed in parallel, but the batches can be executed serially. The systems and methods for slave database replay described herein can be employed to reduce database latency while maintaining the integrity of the slave database.

Although one implementation of the log portion 60 is illustrated, other implementations are possible. For example, the log portion 60 can be in a format compatible with any suitable structured query language (SQL), including, for instance, MySQL.

FIG. 3B is a schematic diagram of another example of a portion 70 of a transaction log. The illustrated log portion 70 includes a first entry 64a, a second entry 64b, a third entry 64c, a fourth entry 64d, a fifth entry 64e, and a sixth entry 64f. The first through sixth entries 64a-64f are associated with a first transaction, a second transaction, and a third transaction.

The log portion 70 of FIG. 3B has a different format than the log portion 60 of FIG. 3A, but their substantive content is the same. Each of the entries 64a-64f includes the event descriptor 52 for describing the event, the transaction endpoint indicator 54 for indicating whether the event is the last event or the endpoint of a transaction, and a transaction identifier 62 for identifying the transaction associated with the event. For example, the first entry 64a includes information related to the event A and a transaction identifier identifying that event A is associated with the first transaction. Similarly, the second entry 64b includes information related to the event E and a transaction identifier identifying that event E is associated with the third transaction. The third entry 64c includes information related to the event D, a transaction identifier identifying that event D is associated with the second transaction, and a transaction endpoint indicator indicating that the event D is the last event of the second transaction. The fourth entry 64*d* includes information related to the event B and a transaction identifier identifying that event B is associated with the first transaction. The fifth entry 64*e* includes information related to the event C, a transaction identifier identifying that event C is associated with the first transaction, and a transaction endpoint indicator indicating that the event C is the last event of the first transaction. The sixth entry 64*f* includes information related to the event F, a transaction identifier identifying that event F is associated with the third transaction, and a transaction endpoint indicator indicating that the event F is the last event of the third transaction.

FIGS. 3A and 3B illustrate two of many suitable log formats that can be used with some implementations of a serial replay system described herein. However, other implementations are possible.

FIG. 4 is a schematic diagram of one example of a database table 80. The table 80 includes a plurality of columns and rows. For example, the table 80 includes a first column 81 associated with an attribute "Identifier", a second column 82 associated with an attribute "Doctor", a third column 83 associated with an attribute "Location", a fourth column 84 associated with an attribute "Patient", and a fifth column 85 associated with an attribute "Time".

The table 80 can be, for example, a table associated with appointments of a medical office. Each row of the table 80 can includes a plurality of values associated with a record of the table. For example, the first row 88*a* includes values "2", "Jones", "Palo Alto", "Brown", and "8:00 AM" in the first through fifth columns 81-85, respectively, and can be used to indicate information related to an appointment stored in the table 80. Similarly, the second row 88*b* includes values "3", "Smith", "San Jose", "Stevens", and "11:00 AM" in the first through fifth columns 81-85, respectively. Additionally, the third row 88*c* includes values "11", "Jones", "San Jose", "Wilson", and "2:00 PM" in the first through fifth columns 81-85, respectively. Furthermore, the fourth row 88*d* includes values "14", "Lee", "Palo Alto", "White", and "11:00 AM" in the first through fifth columns 81-85, respectively.

The table 80 can include a primary key and one or more unique keys that can be used to uniquely identify a row of the table. The primary key and the one or more unique keys can be properties of the table 80 that can be defined during creation of the table. For example, a DDL operation used to create the table 80 can specify that the attribute "Identifier" in the first column 81 is a primary key that is uniquely constrained such that the table 80 does not include any two rows having the same value for the first column 81. Additionally, the DDL operation used to create the table 80 can specify that one or more sets of attributes of the table 80 are unique keys that can each be used to uniquely identify a row of the table 80. For example, the table 80 may be set up to include a first unique key defined by (Doctor, Time) and a second unique key defined by (Patient, Time). Although the table 80 is described as having a primary key and a plurality of unique keys, in certain implementations described herein, tables need not include any primary and/or unique keys.

Figure 5:
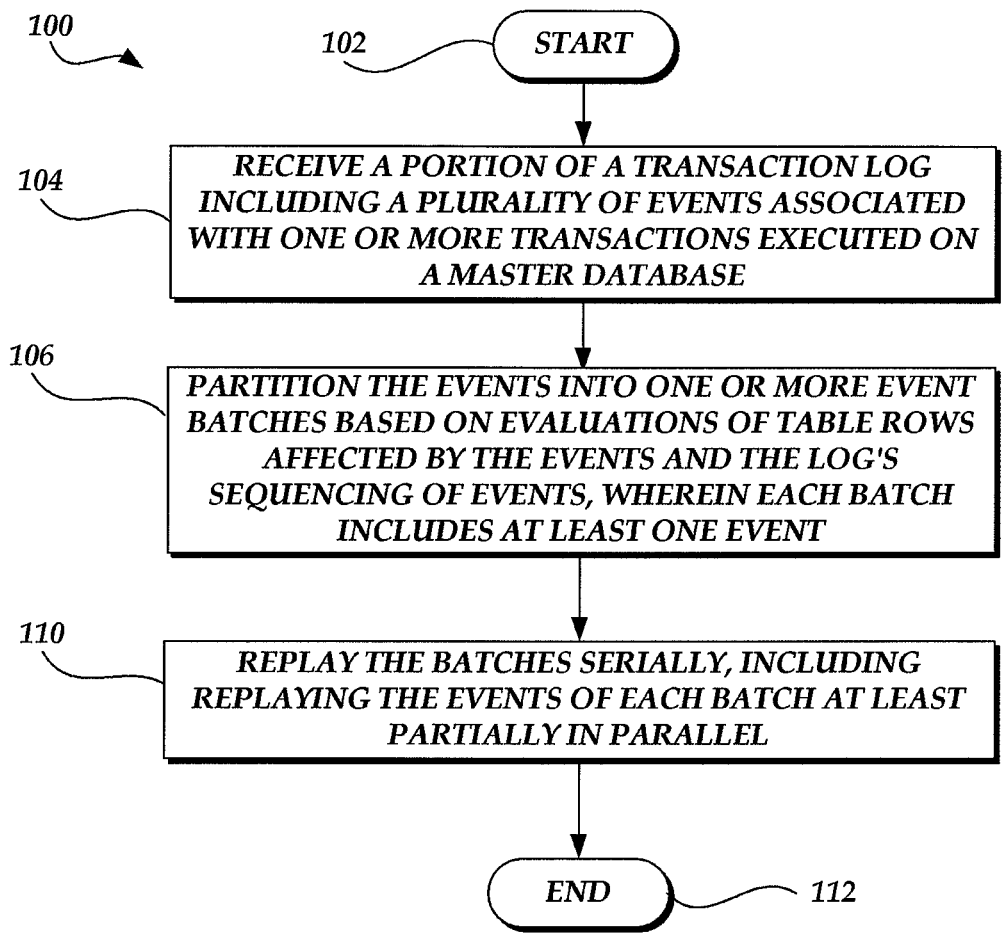
FIG. 5 is a flow chart illustrating a method of replaying events on a slave database in accordance with one embodiment.

FIG. 5 is a flow chart illustrating a method 100 of replaying events on a slave database in accordance with one embodiment. It will be understood that not all of the illustrated blocks are required, and that this method can be modified without departing from the spirit and scope of the invention.

The method 100, depicted from the perspective of a slave replay system, such as the slave replay system 6 of FIGS. 1-2, starts at block 102. In an ensuing block 104, a portion of a transaction log is received. The log includes a plurality of events associated with one or more transactions executed on a master database. The log can be in any suitable format, including for example, either of the log formats illustrated in FIGS. 3A-3B above. The full transaction log can be stored on a master database, and a portion of the log can be sent to the slave replay system over a network.

In an ensuing block 106, each event of the log is assigned to one of multiple event batches based on evaluations of table rows affected by the events and the transaction log's sequencing of the events. For example, the first event in the log can be placed in a first batch, and each subsequent event in the log that does not affect or depend upon any of the table rows associated with events of the first batch can be placed in the first batch. When a "conflicting event" affecting or depending on a row associated with an event in the first batch is detected, the conflicting event can be placed in a second batch. Thereafter, subsequent events in the log can be placed in the second batch until another conflicting event is detected that affects or depends upon at least one of the table rows associated with any of events of the second batch. This process can be repeated until each event of the log has been assigned to a batch.

The method 100 continues at a block 110, in which the batches are replayed serially with the events of each batch replayed at least partially in parallel. For example, the first batch can include a first plurality of events than can be executed concurrently since the events of the first batch do not affect or depend upon the same table rows. After execution of all of the events in the first batch has completed, the events associated with the second batch can be executed. The batches can be replayed serially in this manner until each batch has been executed.

Persons having ordinary skill in the art will appreciate that the execution of a first batch of events may begin and even be completed before other events in the log have been assigned to other batches. Thus, in certain implementations, the execution of the block 106 and the block 110 can overlap in time. The method ends at 112. In an alternative embodiment, all events before a DDL event or the end of the log portion are assigned to a batch before beginning batch execution.

Figure 6:
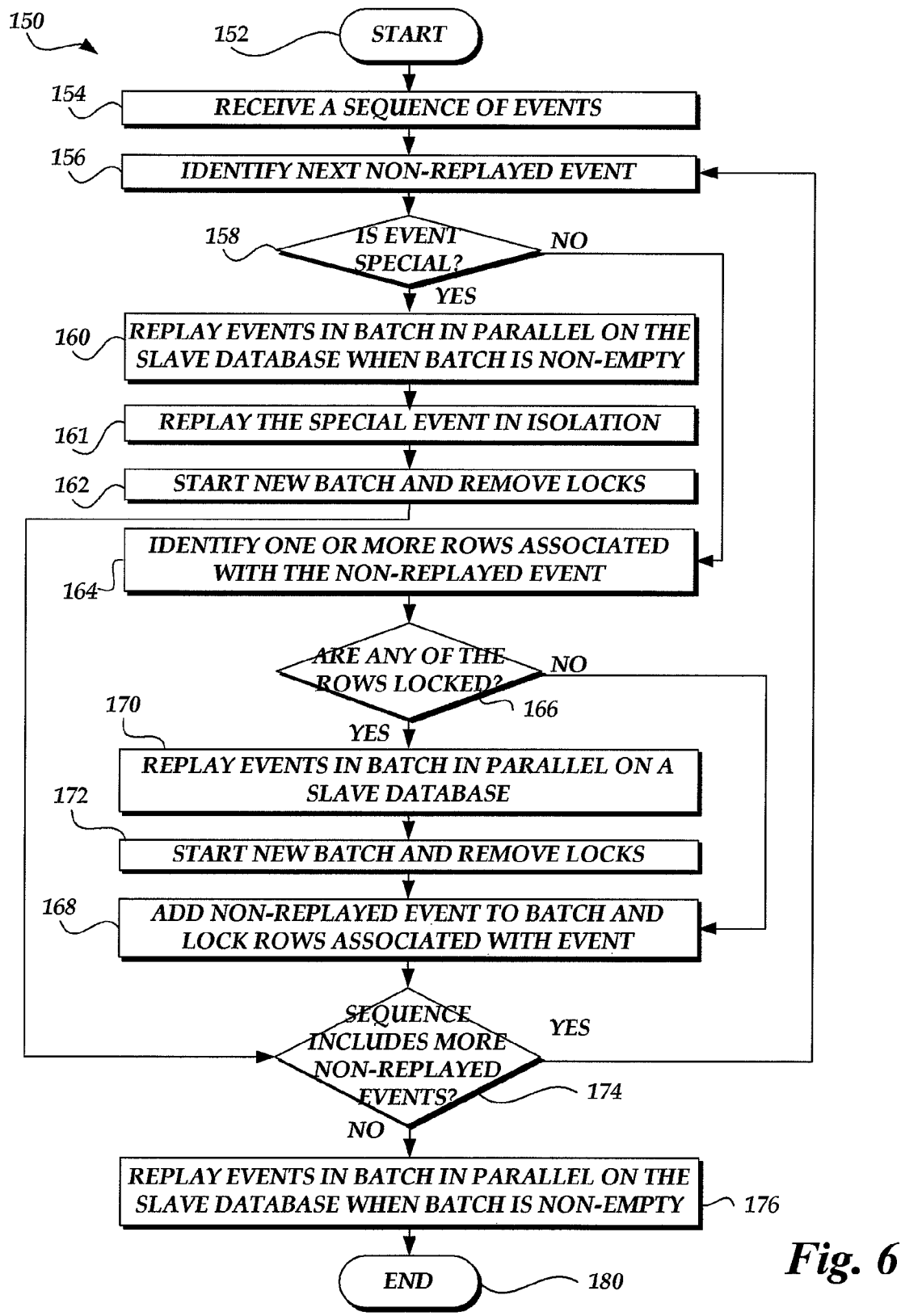
FIG. 6 is a flow chart illustrating a method of replaying events on a slave database in accordance with another embodiment.

FIG. 6 is a flow chart illustrating a method 150 of replaying events on a slave database in accordance with another embodiment. It will be understood that not all of the illustrated blocks are required, and that this method can be modified without departing from the spirit and scope of the invention.

The method 150, depicted from the perspective of a slave replay system, such as the slave replay system 6 of FIGS. 1-2, starts at block 152. In an ensuing block 154, a sequence of events is received. The sequence of events can be, for example, a sequence of events contained in a portion of a transaction log received from a master database. The sequence of events can include a plurality of events associated with one or more transactions executed on the master database. The sequence of events can be in any suitable format, including, for example, a MySQL format.

The method 150 continues at a block 156, in which the next non-replayed event in the sequence is identified. In an ensuing decision block 158, the slave replay system determines if the event is a special event. Certain events, such as data definition language (DDL) operations used to create, alter and/or remove tables of a database can be considered special events preferred to be executed in isolation rather than batched with other events. Additional details of special events will be described in further detail below.

If the answer to the inquiry in the decision block 158 is no, the method 150 proceeds to a block 164, in which one or more rows associated with the non-replayed event are identified. For example, if the event is a data modification language (DML) operation associated with adding or removing a row, the row that is added or removed can be identified in the block 164. For certain events, such as update events, a plurality of rows can be associated with an event. For example, an event that modifies a row (3 1) to read (2 0) can be associated with a first row (3 1) and a second row (2 0).

The method 150 continues to a decision block 166, in which the slave replay system determines if any of the rows identified in the block 164 are locked. For example, the slave replay system can include a lock table (e.g., lock table 30 of FIG. 2) for storing identifications of rows associated with events in a current batch of events. The lock table can begin empty such that no rows are initially locked. The lock table can include one or more table identifiers and one or more row identifiers for identifying particular table rows of the database that are locked.

If the answer to the inquiry in the decision block 166 is no, the method 150 proceeds to the block 168, in which the non-replayed event is added to a batch and the one or more rows associated with the non-replayed event are locked (e.g., added to the lock table). The batch can include one or more events, each of which does not depend on the result of any of the other events in the batch. Since the events of the batch are non-conflicting, the events can be replayed in parallel on the slave database, thereby reducing replay latency. The events of a batch can be identified using a batch list, which can include a list of the events associated with the current batch. The batch list can begin empty. The rows associated with the event can be locked in any suitable manner, such as by adding row identifiers identifying the locked rows to a lock table. For example, when the table includes a primary key, the value of the primary key associated with the table can be added to the lock table. If the table further includes one or more unique keys associated with the table, the values of the unique keys associated with the one or more rows can also be added to the lock table to facilitate identifying locked rows. When the table does not include a primary key or any unique keys, the values for each column of the row can be added to the lock table to identify the row. Additional details of the lock table can be as described later below with reference to FIGS. 8A-9.

The method 150 continues to a decision block 174, in which the slave replay system determines if the sequence of events includes additional non-replayed events. If the answer to the inquiry in the block 168 is yes, the method 150 returns to the block 156 described above in which the next non-replayed event in the sequence is identified. If the answer to the inquiry in the block 174 is no, then the method 150 proceeds to a block 176 in which the events in the batch are replayed in parallel on the slave database when the batch is non-empty. The events in the batch are not associated with any of the same table rows of the database, and thus are can be replayed in parallel on the slave database while preserving the integrity of the slave database. The method then ends at 180.

With reference back to the decision block 166, if the slave replay system determines that any table row associated with the non-replayed event is locked, then the method 150 continues to the block 170, in which the events in the batch are replayed in parallel on the slave database. At this point in the method, the non-replayed event having the locked table row now associated therewith has not been added to the batch. Since the batch does not include any events that affect or depend upon table rows affected or depending upon any other events in the batch, the events of the batch can be parallelized, thereby reducing replay latency. After execution of the events in the batch, the method 150 continues at a block 172, in which a new batch is started and any locks are removed. In implementations using a batch list and/or a lock table, the values in the batch list and/or the lock table can be cleared in block 172. The method 150 continues to the block 168 described above, in which the non-replayed event having the aforementioned locked table row associated therewith (as determined in decision block 166) is added to the batch and the rows associated with the event are locked. Thus, when a conflicting event associated with a locked row is detected in block 166, any events in the current batch of events can be executed in parallel, and the conflicting event can define the start of a new batch.

With reference back to the decision block 158, if the slave replay system determines that the non-replayed event is a special event, then the method 150 continues at a block 160, in which the events in the batch are replayed in parallel on the slave database when the batch is non-empty. The events in the batch are not associated with any of the same table rows of the database, and thus can be replayed in parallel on the slave database.

The method 150 continues at a block 161, in which the special event is replayed in isolation. Certain events, such as data definition language (DDL) operations used to add or remove table columns and/or create or remove tables of a database can be executed in isolation rather than batched with other events. By executing a special event in this manner, database conflicts associated with running DDL and DML operations in parallel can be avoided. After execution of the special event in block 161 has completed, the method 150 can continue to a block 162, in which a new batch is started and any row locks are removed. The method 150 then continues to the decision block 174, which was described earlier.

FIG. 7 is a schematic diagram of another example of a portion 200 of a transaction log. The transaction log portion 200 includes first through tenth events 204a-204j, each of which includes an event descriptor 52, a transaction identifier 62, and a transaction endpoint indicator 54, which can be as described above with reference to FIG. 3B. FIGS. 8A-8G are schematic diagrams illustrating a state of a lock table 220 and a batch list 240 at various instances of time in a method of replaying the transaction log portion 200 of FIG. 7 in accordance with one embodiment. The lock table 220 includes a first column 221 associated with a table identifier and a second column 222 associated with a row identifier.

With reference now to FIGS. 2, 7, and 8A-8H, the slave replay system 6 can receive the portion 200 of the log and store the log portion 200 in the memory 28. Thereafter, the slave replay module 10 can read the first event 204a of the log portion 200 and determine that the event is a DDL event associated with creating a table T1 with a first integer column A and a second integer column B, where the first integer column A is a primary key of the table T1. Since the event 204a qualifies as a special event, the slave replay module 10 can replay the event 204a in isolation.

After replaying first event 204a, the slave replay module 10 can proceed to the second entry 204b of the transaction log portion 200 and determine that the event 204b is a DDL event associated with creating a table T2 with a first integer column C and a second integer column D, where the table T2 does not include a primary key. The slave replay module 10 can determine that the second event 204b is special event and thus can replay the event 204b in isolation.

Figure 8A:
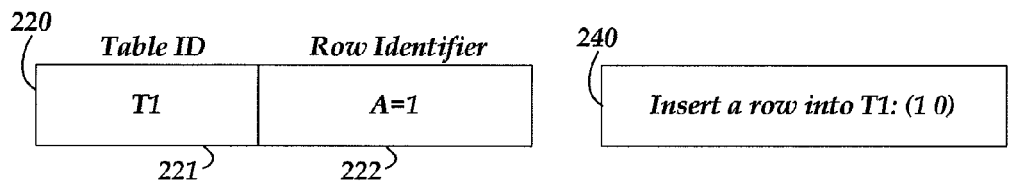

With reference now to FIGS. 2, 7 and 8A, the slave replay module 10 can next proceed to the third event 204c of the log portion 200 and determine that the event 204c is associated with inserting a row (1 0) into the table T1. The slave replay module 10 can update the lock table 220 to lock the row associated with the event 204c and update the batch list 240 to include the event 204c. As shown in FIG. 8A, to lock the row associated with the third event 204c, the slave replay module 10 can add an entry in the lock table 220 corresponding to the value 1 of the first integer column A. Since the first integer column A is a primary key of the table T1 that uniquely identifies table rows of the table T1, locking the value of the primary key associated with the row is equivalent to locking the row associated with the event 204c.

Figure 8B:
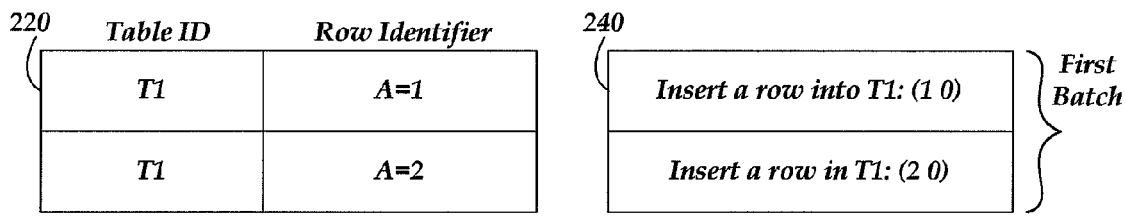

The slave replay module 10 can next proceed to the fourth event 204d of the log portion 200 and determine that the event is associated with inserting a row (2 0) into the table T1. After determining that the table row associated with the fourth entry 204d is not locked in the lock table 220, the slave replay module 10 can update the batch list 240 to include the event 204d and can lock the value 2 of the primary key that is associated with fourth event 204d, as shown in FIG. 8B.

The slave replay module 10 can next proceed to the fifth event 204e of the log portion 200 and determine that the event is associated with updating the row (1 0) of the table T1 to read (1 1). After determining that the fifth event 204e is associated with a row identified by a primary key value of 1, the fifth event 204e can determine that the row is locked because the primary key value of 1 is already in the lock table 220. The slave replay module 10 can then replay the events of the batch list 240 of FIG. 8B in parallel on the slave database 8 as a first batch. After all the events have been executed, the batch list 240 can be cleared and the values of the lock table 220 can be cleared.

Figure 8C:
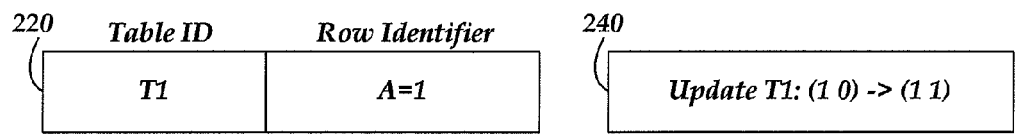

With reference now to FIGS. 2, 7 and 8C, the slave replay module 10 can add the fifth event 204e to the batch list 240 and lock the row associated with the fifth event 204e. Since the fifth event 204e is associated with a row of the table T1 identified with a primary key value of 1, the primary key value of 1 is added to the lock table 220.

Figure 8D:
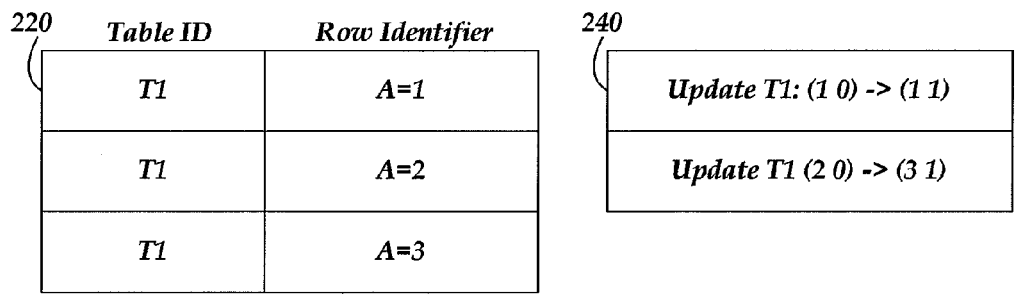

The slave replay module 10 can next proceed to the sixth event 204f of the log portion 200 and determine that the event is associated with updating the row (2 0) of the table T1 to read (3 1). The slave replay module 10 can determine that the sixth event 204f is associated with two rows of the table T1. For example, the slave replay module 10 can determine that the sixth event 204f is associated with a removal of a row of the table T1 identified with a primary key value of 2 and is further associated with writing a row of the table T1 identified with a primary key value of 3. As shown in FIG. 8D, the slave replay module 10 can update the lock table 220 to include a first entry locking a primary key value of 2 and a second entry locking a primary key value of 3. Additionally, the sixth event 204f can be added to the batch list 240.

Figure 8E:
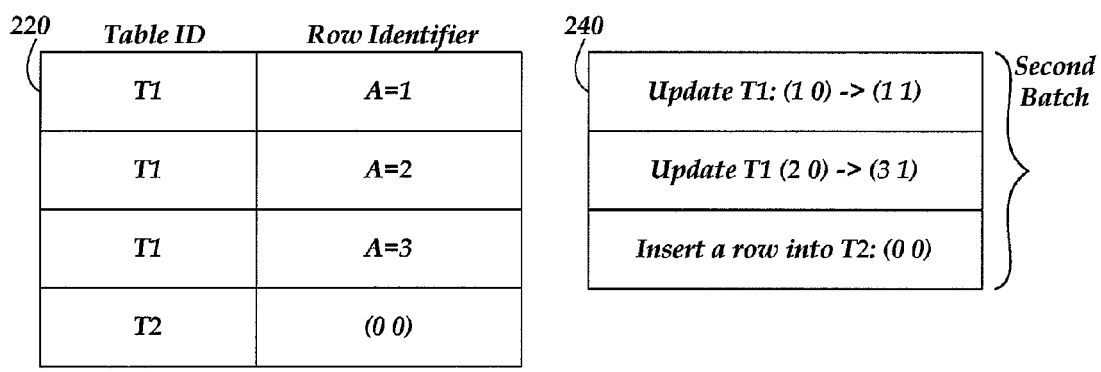

With reference now to FIGS. 2, 7 and 8E, the slave replay module 10 can next proceed to the seventh event 204g of the log portion 200 and determine that the seventh event 204g is associated with inserting a row (0 0) into the table T2. The slave replay module 10 can determine that the row (0 0) of the table T2 is not locked, and can update the lock table 220 to lock the row (0 0) of the table T2. Since the table T2 does not include a primary key, the lock table 220 can be updated to include an entry identifying both the value of 0 of the first integer column C and the value of 0 of the second integer column D associated with the seventh event 204g. The seventh event 204g can also be added to the batch list 240.

The slave replay module 10 can next proceed to the eighth event 204h of the log portion 200 and determine that the event is associated with inserting a row (0 0) into the table T2. After determining that the eighth event 204h is associated with a row (0 0) of the table T2, and that a row of the same value is in the lock table 220, the slave replay module 10 can execute the events of the batch list 240 of FIG. 8E in parallel on the slave database 8 as a second batch. After all the events have been executed, the batch list 240 can be cleared and the values of the lock table 220 can be cleared. Although it is possible for the seventh and eighth events 204g, 204h to be executed in parallel because each event is a simple insert of different rows with the same values, executing the seventh and eighth events 204g, 204h in separate batches can reduce the complexity of the batching algorithm by avoiding a need to track operations performed on the row to determine whether the operations are compatible. Thus, in certain embodiments described herein, lock tables can be used not only to identify particular table rows that are locked, but also to identify whether an event associated with a different table row having the same values is in the batch. However, other implementations are possible.

Figure 8F:
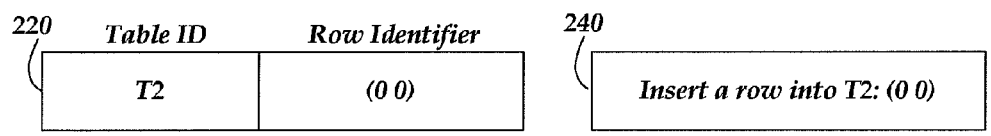

With reference now to FIGS. 2, 7 and 8F, the slave replay module 10 can add the eighth event 204h to the batch list 240 and lock the row (0 0) of the table T2 in the lock table 220.

The slave replay module 10 can next proceed to the ninth event 204i of the log portion 200 and determine that the event is associated with updating the row (3 1) of the table T1 to read (3 2). After determining that the ninth event 204i is associated with a row of the table T1 identified by a primary key value of 3, the slave replay module 10 can determine that this row is not locked in the lock table 220. As illustrated in FIG. 8G, the slave replay module 10 can add the value of 3 of the primary key of the table T1 to the lock table 220 and can add the ninth event 204i to the batch list 240.

With reference now to FIGS. 2, 7 and 8H, the slave replay module 10 can next proceed to the tenth event 204j of the log portion 200 and determine that the tenth event 204j is associated with inserting a row (0 1) into the table T2. The slave replay module 10 can determine that the row (0 1) of the table T2 is not locked, and can update the lock table 220 to lock the row (0 1). Since the table T2 does not include a primary key, the lock table 220 can be updated to include an entry identifying both the value of the first integer column C and the value of the second integer column D associated with the tenth event 204j. The tenth event 204j can also be added to the batch list 240.

The slave replay module 10 can next determine that there are no more events in the portion of the log portion 200. Thus, the events of the batch list 240 of FIG. 8H can be executed in parallel on the slave database 8 as a third batch.

By replaying the events of the log portion 200 in parallel, the latency associated with replaying events on a slave database 8 can be reduced. For example, for the embodiment described above, a ten event log was replayed using two DDL operations and three batches of events.

FIG. 9 is a schematic diagram of one embodiment of a lock table 250. The lock table 250 includes a plurality of columns. For example, the table 250 includes a first column 251 associated with a table identifier, a second column 252 associated with a primary key identifier, a third column 253 associated with a first unique key identifier, and a fourth column 254 associated with a second unique key identifier.

The primary key identifier and the first and second unique key identifiers can operate as row identifiers in the lock table 250. In certain implementations, a lock table can include a plurality of row identifiers to aid in identifying a table row. For example, when locking rows associated with database tables that include a primary key and one or more unique keys, the lock table can include a column for the primary key and a column for each of the unique keys.

For example, with reference back to FIG. 4, the database table 80 includes a primary key associated with the attribute "Identifier", a first unique key identified by the values of the attributes (Doctor, Time), and a second unique key identified by the values of the attributes (Patient, Time). When locking rows associated with the database table 80, the lock table can include an entry for the primary key and each of the unique keys. Thus, when a slave replay module identifies that an event is associated with the first row 88a of the database table 80, the lock table 250 of FIG. 9 can be updated to include a first row 258a including the values "Appointments", "2", "(Jones, 8:00 AM)", and "(Brown, 8:00 AM)" for the first through fourth columns 251-254, respectively, where "Appointments" is used to identify the database table 80. Similarly, when a slave replay module identifies that an event is associated with the fourth row 88d of the database table 80, the lock table 250 can be updated to include the entries "Appointments", "14", "(Lee, 11:00 AM)", and "(White, 11:00 AM)" in the first through fourth columns 251-254, respectively. Identifying both the primary key and each of the unique keys of a table can aid in identifying a row associated with an event, thereby helping to assign events in a transaction log to one or more batches.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of replaying transactions in a slave database, the method comprising:
  receiving a sequence of events executed on a master database, the sequence of events associated with one or more tables and at least one transaction of the master database;
  identifying a first row of the one or more tables associated with a first event in the sequence;
  identifying a second row of the one or more tables associated with a second event in the sequence, the second event after the first event; and
  replaying the first and second events on the slave database in parallel if the first and second rows are different rows with unique sets of values, and otherwise replaying the first and second events serially;
  wherein the first and second rows are each associated with a first table of the one or more tables,
  wherein identifying the first row associated with the first event includes identifying a value of a primary key of the first table associated with the first event, and wherein identifying the second row associated with the second event includes identifying a value of the primary key associated with the second event,
  wherein replaying comprises determining that the first and second rows are different rows based on the value of the primary key associated with the first event and the value of the primary key associated with the second event, and
  wherein the method is performed by one or more computing devices.

2. The method of claim 1, further comprising:
  identifying a third row associated with a third event in the sequence, the third event after the first and second events; and
  replaying the first, second and third events on the slave database at least partially in parallel in a first batch if the first, second and third rows each are different rows with unique sets of values.

3. The method of claim 2, further comprising:
  identifying a fourth row associated with a fourth event in the sequence, the fourth event after the first, second and third events; and
  replaying the fourth event on the slave database in a second batch after replaying the first batch if the fourth row is the same row as any of the first, second, and third rows, and otherwise replaying the first, second, third and fourth events at least partially in parallel in the first batch if the first, second, third and fourth rows each are different rows with unique sets of values.

4. The method of claim 1, wherein replaying the first and second events on the slave database comprises replaying the first and second events in parallel when the value of the primary key associated with the first event is different than the value of the primary key associated with the second event.

5. The method of claim 1, wherein said replaying the first and second events on the slave database in parallel when the first and second rows are different rows with unique sets of values comprises:
  storing the value of the primary key associated with the first event in a lock table; and
  determining that the first and second rows are different rows by determining that the value of the primary key associated with the second event is not included in the lock table.

6. The method of claim 5, further comprising responding to the determination that the value of the primary key associated with the second event is not included in the lock table by adding the value of the primary key associated with the second event to the lock table.

7. The method of claim 5, wherein the first event is a row update, and wherein identifying the first row associated with the first event includes identifying a first value of the primary key associated with a value of the first row before the update and indentifying a second value of the primary key associated with a value of the first row after the update, and wherein storing the value of the primary key associated with the first event in the lock table comprises storing the first value and the second value of the primary key in the lock table.

8. The method of claim 5, wherein said otherwise replaying the first and second events serially comprises determining that the value of the primary key associated with the second event is included in the lock table.

9. The method of claim 8, further comprising removing all of the values from the lock table.

10. The method of claim 1, wherein the first and second rows are each associated with a first table of the one or more tables, and wherein identifying the first row associated with the first event further includes identifying a value of at least one unique key of the first table associated with the first event, and wherein identifying the second row associated with the second event further includes identifying a value of the least one unique key associated with the second event.

11. The method of claim 1, wherein receiving the sequence of events comprises receiving a portion of a transaction log from a master database.

12. The method of claim 11, further comprising:
  identifying a special event in the portion of the transaction log; and
  executing the special event in isolation from the other events in the sequence of events.

13. The method of claim 12, wherein the special event includes at least one of a table creation, a table deletion, a column creation or a column deletion.

14. A non-transitory computer-readable storage medium comprising instructions that when executed perform a method of replaying transactions in a slave database, the method comprising:
  receiving a sequence of events executed on a master database, the sequence of events associated with one or more tables and at least one transaction of the master database;
  identifying a first row of the one or more tables associated with a first event in the sequence;
  identifying a second row of the one or more tables associated with a second event in the sequence, the second event after the first event; and
  replaying the first and second events on the slave database in parallel if the first and second rows are different rows with unique sets of values, and otherwise replaying the first and second events serially,
  wherein the first and second rows are each associated with a first table of the one or more tables,
  wherein identifying the first row associated with the first event includes identifying a value of a primary key of the first table associated with the first event, and wherein identifying the second row associated with the second event includes identifying a value of the primary key associated with the second event, and
  wherein replaying comprises determining that the first and second rows are different rows based on the value of the primary key associated with the first event and the value of the primary key associated with the second event.

15. The computer-readable storage medium of claim 14, the method further comprising:

identifying a third row associated with a third event in the sequence, the third event after the first and second events; and replaying the first, second and third events on the slave database at least partially in parallel in a first batch if the first, second and third rows each are different rows with unique sets of values.

16. The computer-readable storage medium of claim 14, wherein replaying the first and second events on the slave database comprises replaying the first and second events in parallel when the value of the primary key associated with the first event is different than the value of the primary key associated with the second event.

17. The computer-readable storage medium of claim 14, wherein said replaying the first and second events on the slave database in parallel when the first and second rows are different rows with unique sets of values comprises:

storing the value of the primary key associated with the first event in a lock table; and determining that the first and second rows are different rows by determining that the value of the primary key associated with the second event is not included in the lock table.

18. The computer-readable storage medium of claim 17, the method further comprising responding to the determination that the value of the primary key associated with the second event is not included in the lock table by adding the value of the primary key associated with the second event to the lock table.

19. The computer-readable storage medium of claim 17, wherein said otherwise replaying the first and second events serially comprises determining that the value of the primary key associated with the second event is included in the lock table.

20. A system for replaying transactions on a slave database, the system comprising:

a slave replay module configured to receive a transaction log including a sequence of events executed on a master database, the sequence of events associated with one or more tables and at least one transaction of the master database; and one or more computing devices operative to implement the slave replay module;

wherein the slave replay module is configured to identify a first row of the one or more tables associated with a first event in the sequence, and to identify a second row of the one or more tables associated with a second event in the sequence, the second event after the first event, wherein the slave replay module is configured to replay the first and second events on the slave database in parallel if the first and second rows are different rows with unique sets of values and to otherwise replay the first and second events serially, wherein the first and second rows are each associated with a first table of the one or more tables, wherein identifying the first row associated with the first event includes identifying a value of a primary key of the first table associated with the first event, and wherein identifying the second row associated with the second event includes identifying a value of the primary key associated with the second event, wherein replaying comprises determining that the first and second rows are different rows based on the value of the primary key associated with the first event and the value of the primary key associated with the second event.

21. The system of claim 20, wherein the slave replay module is further configured to identify a third row associated with a third event in the sequence, the third event after the first and second events, and to replay the first, second and third events on the slave database at least partially in parallel in a first batch if the first, second and third rows each are different rows with unique sets of values.

22. The system of claim 20, wherein the slave replay module is further configured to replay the first and second events in parallel when the value of the primary key associated with the first event is different than the value of the primary key associated with the second event.

23. The system of claim 20, further comprising a lock table, wherein the slave replay module is further configured to store the value of the primary key associated with the first event in the lock table, and wherein the slave replay module is further configured to determine that the first and second rows are different rows by determining that the value of the primary key associated with the second event is not included in the lock table.

24. The system of claim 23, wherein the slave replay module is further configured to respond to the determination that the value of the primary key associated with the second event is not included in the lock table by adding the value of the primary key associated with the second event to the lock table.

* * * * *